United States Patent
Koivunen

Patent Number: 6,071,208
Date of Patent: Jun. 6, 2000

[54] COMPACT MULTI-RATIO AUTOMATIC TRANSMISSION

[76] Inventor: Erkki Koivunen, 18260 Blue Heron Pointe Dr., Northville, Mich. 48167

[21] Appl. No.: 09/313,884

[22] Filed: May 18, 1999

Related U.S. Application Data
[60] Provisional application No. 60/090,145, Jun. 22, 1998.

[51] Int. Cl.$^7$ ............................................. F16H 3/66
[52] U.S. Cl. ........................ 475/275; 475/276; 475/281; 475/282; 475/288
[58] Field of Search ................................ 475/269, 271, 475/275, 276, 280, 281, 282, 284, 285, 286, 288

[56] References Cited

U.S. PATENT DOCUMENTS

| | | | |
|---|---|---|---|
| 3,946,623 | 9/1999 | Murakami et al. | 475/280 X |
| 3,946,624 | 3/1976 | Murakami et al. | 475/276 X |
| 3,979,974 | 9/1976 | Murakami | 475/280 X |
| 4,038,887 | 8/1977 | Murakami et al. | 475/276 X |
| 5,090,952 | 2/1992 | Asada | 475/278 |
| 5,106,352 | 4/1992 | Lepelletier . | |
| 5,135,444 | 8/1992 | Hattori . | |
| 5,226,862 | 7/1993 | Hattori . | |
| 5,435,792 | 7/1995 | Justice et al. | 475/276 |
| 5,525,117 | 6/1996 | Morisawa et al. | 475/281 |
| 5,593,359 | 1/1997 | Justice et al. | 475/280 |
| 5,716,298 | 2/1998 | Beim et al. . | |
| 5,946,984 | 9/1999 | Nitsche et al. | 475/50 X |

FOREIGN PATENT DOCUMENTS

| | | |
|---|---|---|
| 2-154844 | 6/1990 | Japan . |
| 3-56745 | 3/1991 | Japan . |
| 3-56746 | 3/1991 | Japan . |
| 356747 | 3/1991 | Japan . |
| 8-105497 | 4/1996 | Japan . |
| 8-105498 | 4/1996 | Japan . |

*Primary Examiner*—Khoi Q. Ta
*Attorney, Agent, or Firm*—Reising, Ethington, Barnes, Kisselle, Learman & McCulloch, P.C.

[57] ABSTRACT

An automatic transmission for motor vehicles comprising three interconnected planetary gear units, two rotating friction clutches and four friction brakes providing six optimized forward gear ratios and a reverse ratio, all assembled into a compact package no larger than the current four-speed automatic transmissions. This invention preferably utilizes two multi-plate rotating clutches and special friction force balanced brake bands that allows self-synchronized ratio shifts without creating any side loading of associated band drums.

13 Claims, 7 Drawing Sheets

| | C1 | C2 | B1 | B2 | B3 | B4 | RATIOS | STEPS |
|---|---|---|---|---|---|---|---|---|
| 1ST | | | X | | | X | 3.964 | 1.833 |
| 2ND | X | | X | | | | 2.162 | 1.526 |
| 3RD | | X | X | | | | 1.417 | 1.417 |
| 4TH | X | X | | | | | 1.000 | 1.254 |
| 5TH | | X | | | | X | 0.797 | 1.243 |
| 6TH | | X | | | X | | 0.642 | |
| REV | | | | X | | X | −3.281 | |

BASIC RATIOS: R1=1.2  R2=2.4  R3=1.9

1ST, 2ND & 3RD BAND (B1)

REVERSE BAND (B2)

6TH BAND (B3)

1ST, 5TH & REVERSE BAND
(B4)

COMPACT MULTI-RATIO AUTOMATIC TRANSMISSION

This application is based on provisional application No. 60/090,145 filed on Jun. 12,1998 by Erkki A. Koivunen and is hereby incorporated by reference.

BACKGROUND OF THE INVENTION

1. Field of the Invention

This invention relates to power transmissions for automotive motor vehicles and more particularly to a new and improved compact and foreshortened automatic change ratio transmission with straight forward planetary gearing uniquely coupled together and controlled by friction drive establishing devices to provide a wide range of advantageously-stepped gear ratios.

2. Description of Related Art

Automatic change speed transmissions have seen ongoing development for improvements and enhancement over a long time period. The type of transmission comprising a hydrodynamic torque converter and planetary gearing with hydraulic and electronic controls has reached almost exclusive usage in domestic vehicles and is gaining rapidly in many other developed countries. However, such transmissions generally do not meet new and higher fuel economy standards and/or performance equipment.

Currently the automotive industry offers five and six speed automatic transmissions, which conventionally require three planetary gear units and a larger number of friction drive establishing devices (clutches and brakes) to control the gearing than are required for four-speed transmissions. U.S. Pat. No. 5,226,826 issued Jun. 13, 1993 for Multiple Planetary Gear System for Multi-Speed Automatic Transmission discloses several examples of six speed automatic transmissions that include a double pinion planetary gearset as one of the planetary gear units. However, these arrangements differ from the present invention in that they contain three space-demanding rotating clutches against two in this invention, which inevitably shows up in the size and cost of the transmission. This also applies to U.S. Pat. No. 5,716,298 issued Feb. 10, 1998 for Multiple-Speed Automatic Transmission for Automotive Vehicle having four rotating clutches.

The continued demand for enhanced performance of automatic transmissions has created need for an extremely compact transmission suitable for use in a front and rear-wheel drive vehicle and able to fit in a space that is greatly reduced in comparison to the space required for conventional five-speed or six-speed automatic transmissions. Front-wheel drive vehicles present particularly acute problems because of the inherent space limitation associated with packaging the transmission and engine with their axes directed transversely between the drive wheels of the vehicle.

SUMMARY OF THE INVENTION

The automatic transmission of the present invention provides an important alternative to current planetary gear transmissions, and to the more recent continuously variable transmissions (CVT transmissions). In this invention there is an improved arrangement of a double pinion planetary gearset and two simple planetary gear units operatively interconnected and controlled by associated friction drive establishing devices, which are uniquely arranged in relation to the gear units providing a multitude of appropriately stepped gear ratios suitable for vehicles operating in a wide variety of road and load conditions.

Since the practical gear ratios obtainable from a simple planetary are very limited, a double pinion planetary is advantageously employed. For the ratios needed here, the ring gear torque in the double pinion planetary gearset must be 1.75–1.85 times the input torque, such torque is not available from a simple planetary gearset since the planetary gears have to be so small that they are not practical. The double pinion planetary further offers more flexibility for making connection to other transmission elements, which further augments the design of the compact transmissions of this invention.

The transmissions of this invention are highly compact torque converter driven, multi-planetary units with associated friction drive establishing devices foreshortened to fit into a crowded engine compartment of vehicles and uniquely connected and controlled to provide five or six forward drive ratios and a reverse ratio.

Advantages of the transmission of this invention include compactness, lightweight and simplicity in construction, particularly when compared to other currently produced five and six speed transmissions. The transmission of this invention can be produced at low cost with ideal ratios, ratio steps and with wide ratio coverage. Due to use of friction bands as braking devices, which have significantly lower frictional drag than the commonly used multi-plate clutches, the spin losses in these transmissions are substantially lower than most current transmissions. With low spin losses, there is a notable increase in fuel economy in a motor vehicle.

It is a further feature, object and advantage of this invention to provide a new and improved transmission incorporating a unique planetary gearing arrangement selectively controlled by friction drive establishing devices preferably including self-synchronizing friction brake bands free of side loading capable of producing a plurality of forward gear ratios and at least one reverse ratio resulting in a straight forward, simple, economical and light-weight automatic transmission.

It is another feature, object and advantage of the present invention is to provide an optimized automatic change ratio transmission in which there is a minimized number of planetary gearsets and associated friction elements to provide a desired number of practical gear ratios. The transmission gearing comprises three planetary units, two conventional units serially behind one double pinion planetary uniquely arranged and controlled to provide desired gear ratios for every driving situation.

In this invention only six friction elements are used obtain six speeds forward and one reverse. Two friction elements are used to establish each ratio and only one of them is switched during any shift or skip shift. The transmission is an extremely compact package for a 6-speed transmission and is readily usable in most crowded engine compartments. The self-synchronizing band, enhanced with electronic controls, are preferred as brake bands to provide smooth, consistently well timed freewheeler type shifts. In some locations, force-balanced brakes are used to eliminate the need of ground support normally required for conventional friction brake bands. In this invention, the installation of brake bands concentrically over the planetary, gears has a major impact on the compactness of the transmission.

These and other objects, features and advantages will become more apparent from the following detailed description and drawing:

DESCRIPTION OF THE PREFERRED EMBODIMENTS

Figures 1, 2:
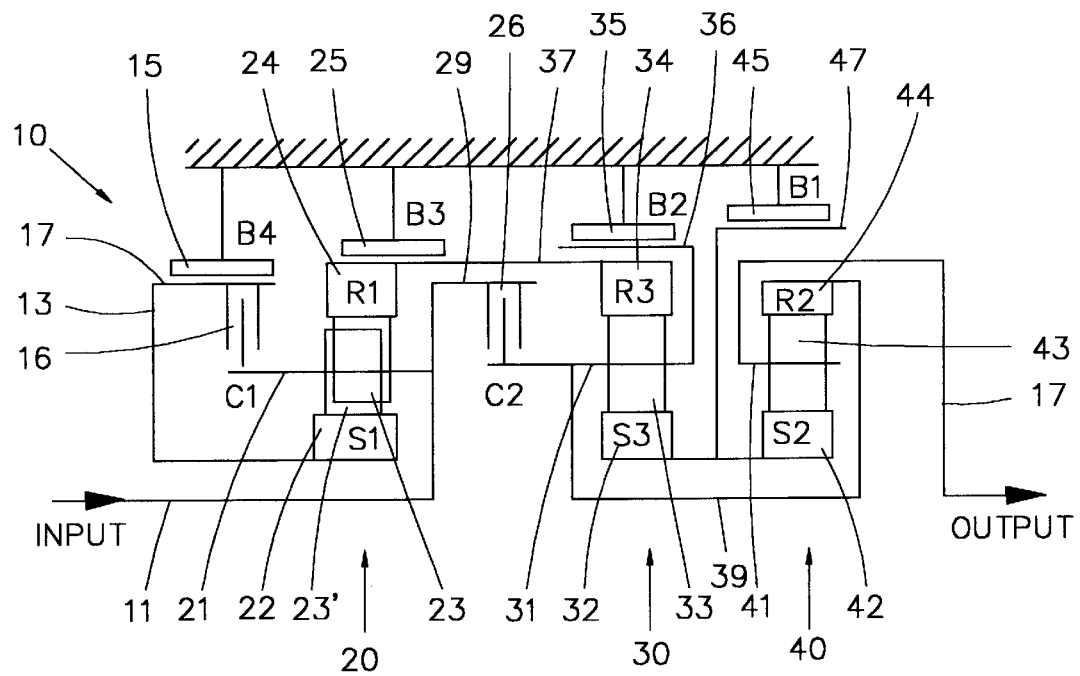
FIG. 1 is a diagrammatic view of an six-speed automatic change ratio transmission for vehicle incorporating principles of the present invention.
FIG. 2 is a chart of the schedule of engagement of friction devices to establish the drive ratios of automatic transmissions of FIG. 1 of this invention.

Turning now in greater detail to the drawings, the first embodiment of the six-speed transmission 10 is shown schematically in FIG. 1. This embodiment is best suited for rear wheel driven vehicles where the length of transmission is not as critical as in front wheel driven vehicles. The transmission primarily comprises three operatively interconnected planetary gearsets numbered 20, 30 and 40. The first of these planetary gearsets is a double pinion type planetary gearset 20 and the others are simple planetary gearsets or units. The transmission is preferably equipped with a conventional hydrokinetic torque converter not shown and has a turbine-driven axially extending input shaft 11. This shaft is drivingly connected with the carrier 21 of the double pinion gearset, which rotatably supports a plurality of equally spaced pairs of meshing planetary pinions 23, 23'. In each pair, one of the pinions 23' meshes with sun gear 22 and the other pinion 23 meshes with a high-torque ring or annulus gear 24. A drum-like clutch housing 13 directly connected with sun gear 22 has a multiplate clutch 16 (C1) operatively mounted therein. This clutch comprises a plurality of clutch plates slidably attached to the internal wall of the housing 13 which are interleaved with faced clutch plates connected drivably with carrier 21. The outer surface of the clutch housing is surrounded by a self-synchronizing friction band 15 (B4) such as disclosed in my U.S. Pat. No. 5,588,928 issued Dec. 31, 1996 for Self-Synchronizing Brake Band Actuating System For Automatic Change Speed Transmissions hereby incorporated by reference. Band 15 is applied in first, fifth and reverse gears.

The ring gear 24 has an extension 37 for transmitting the high-torque developed from the double pinion planetary gear unit 20 to the ring gear 34 of the adjacent gear unit 30. This ex-tension 37 also serves as an annular brake drum for a force balanced band 25 (B3) such as disclosed in my International patent application WO97/03304 published Jan. 30, 1997 under the Patent Cooperation Treaty for Force Balanced Multi-Part Brake Band With Self-Synchronizing Actuating System and corresponding U.S. application Ser. No. 08/983,244 filed Jan. 12 1998 which are hereby incorporated by reference. Being free of side loading, the brake drum provided by ex-tension 37 need not be supported to the ground as in conventional band systems. Carrier 31 of the second gearset 30 of the embodiment of FIG. 1 supports the planetary pinions 33 for rotation thereon, and directly receives the input torque through selectively applied multi-plate clutch 26 (C2). Clutch 26 has a drum-like housing 29 drivingly connected to the input shaft 11 and to the carrier 21 of the double pinion planetary gearset. The drive plates operatively mounted to the interior of clutch housing 29 are interleaved with friction plates mounted on the carrier 31 of the second planetary gearset and are selectively drivingly engaged by a piston not shown. Drum 36, secured to the carrier 31, is also surrounded by a brake band 35 (B2) which, like band 25, is preferably a force balanced band.

An elongated shaft 39 disposed in alignment with input shaft 11 connects carrier 31 with a ring gear 44 of third gearset 40. Sun gear 32 of the second gearset 30 can be integral with sun gear 42 of the third gearset 40. Planetary pinions 43 mounted on carrier 44 mesh with sun gear 42 and ring gear. Brake drum 47 is disposed around gearset 40 and is in turn, surrounded by a three-strap, force-balanced and self-synchronized friction band 45 (B1). As shown brake drum 47 is attached to an intermediate portion of shaft 38 for these sun gears. Carrier 41 has planetary pinions 42 mounted thereon which mesh with sun gear 42 and ring gear 44 provides the output member for this transmission and is operatively connected to an output shaft 17.

FIG. 2 shows in chart form how different ratios are obtained for this transmission as well as an example of some ratios and two steps between such ratios. Functionally, first gear is established by engaging brake bands 15 and 45 (B1 and B4). With the brake band 15 holding the sun gear 22 of double pinion gearset 20 stationary, and with the input shaft 11 driving the carrier 21, the ring gear 24 of the gearset 20 and the drivingly connected ring gear 34 of gearset 30 turn in the same direction as the input, although at lower speed and carrying higher torque than the input. With the sun gears 32 and 42 held stationary by the applied friction band 45, the transmitted torque multiplied in the gear unit 20 will be further increased in the series arranged planetary gearsets 30 and 40. Carrier 41 in the third gear unit 40 transmits the output torque to the output shaft 17 that delivers power further to the driving wheels of the vehicle.

For second gear, multi-plate clutch 16 (C1) is applied and the brake band 15 (B4) is set in the one-way mode for a self-synchronized, smooth upshift. The band 45, holding sun gears 32 and 42, remains applied and the torque transmitted directly to gear units 30 and 40 is multiplied as in first gear.

In third gear clutch 26 (C2) is engaged and clutch 16 (C1) is simultaneously released while brake band 45 still stays applied. Torque is now transferred by clutch 26 directly to annular gear 34 in the second gear unit 30. In third gear only gear unit 30 is active while the other two are idling. The 2-3 clutch to clutch shift is not self synchronized and needs electronically controlled timing.

In fourth gear clutch 16 is again brought on and self-synchronizing band 45 is released. With both clutches applied, transmission is placed in the direct drive mode.

To establish fifth gear, which is the first overdrive ratio, brake band 15 (B4) is applied and clutch 16 simultaneously released while clutch 26 (C2) still remains engaged. This establishes a split path torque flow arrangement that produces the desired first overdrive ratio. This clutch to bands shift also requires electronic shift timing.

For sixth gear, clutch 26 stays engaged and off-coming brake band 15 is set in one-way mode for a synchronized upshift responding to the torque increase in the oncoming band 25 (B3). This provides another deeper overdrive gear ratio.

Both brake bands 15 and 35 are applied for reverse gear. Torque is passed through gear unit 20 to annulus gear 34 of gear unit 30, where it is reversed and passed further to the gear unit 40, which multiplies the torque to a desired reverse gear ratio value.

Figure 3:
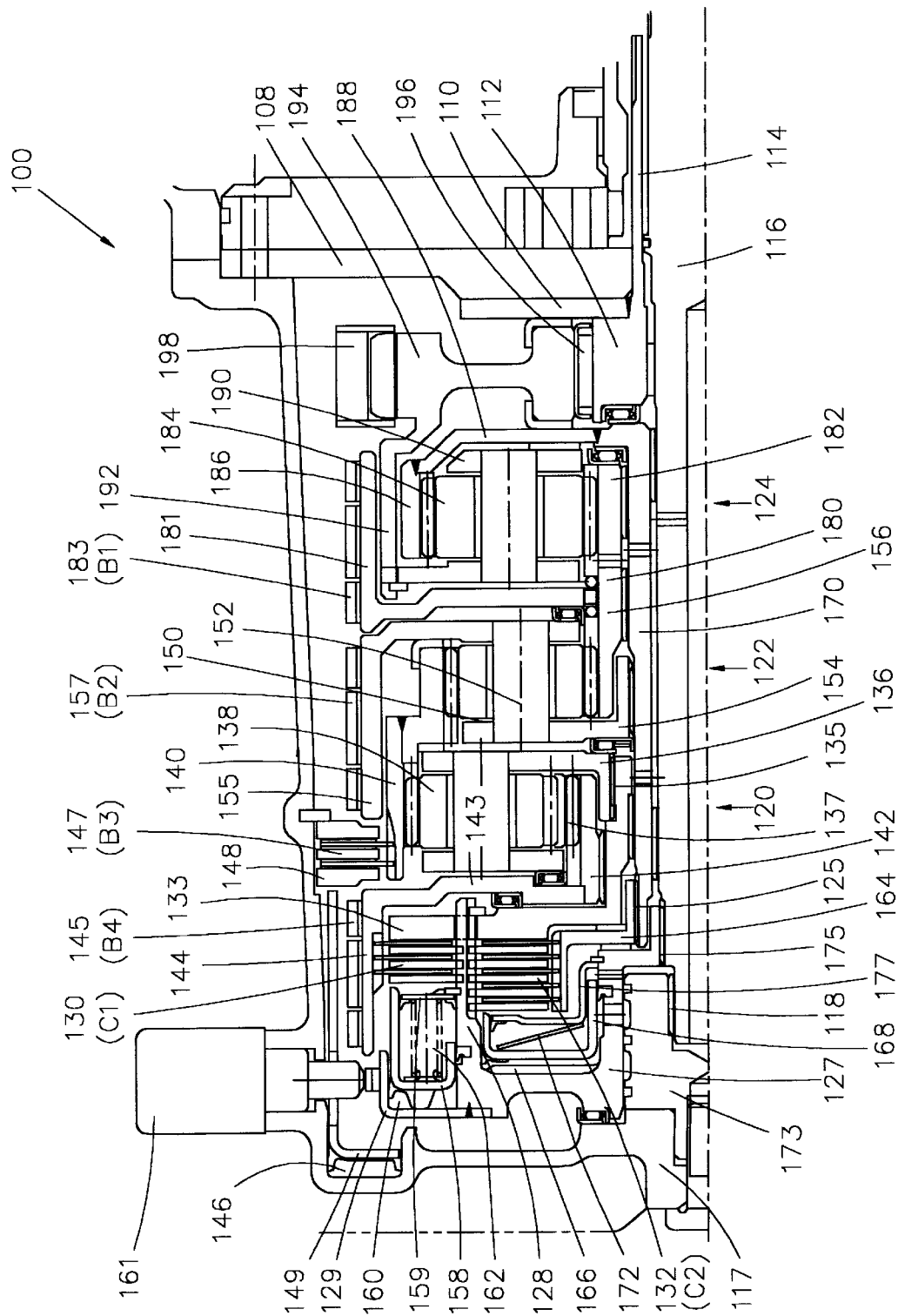
FIG. 3 is a cross-sectional view of a more compact embodiment of this invention particularly suited for front wheel drive vehicles.

Another preferred embodiment of my invention is illustrated in FIG. 3. In this embodiment. a six-speed transmission is disclosed, which is shorter than the first embodiment and is particularly well suited for front wheel drive vehicles with a transversely oriented powertrain.

In this arrangement, power from engine is transmitted through a conventional torque multiplying hydrodynamic torque converter (not shown) to the transmission gearbox. The gearbox input shaft 116, which is drivingly connected to the torque converter turbine, extends to the input clutch housing 127 and is supported by a journal bearing 118 inserted in a hub, which is attached to the end wall 117 of the transmission case or gear box 119. In general, input shaft 116 turns about the central axis of this transmission and provides the rotatable input to the three planetary gearsets 120,122 and 124 which make up the change speed gearing of this invention. As in the first embodiment the planetary gearset 120 is a dual pinion planetary gearset while the other gearsets 122 and 124 are simple planetary units.

The distal end of the drive shaft 116 is splined at 175 to the inner hub of input clutch housing 127 that defines a driving drum 128 providing the drive to a pair of concentric, selectively engageable multi-plate clutches 130 (C1) and 132 (C2) operatively mounted thereon as well as to the radial drive disc 133. Disc 133, which also acts as a backing for both above clutches, has a hub attached by splines 135 to the carrier 136, which supports planetary pinions 137 and 138 of the dual pinion planetary gearset 120.

The carrier 136 of the dual pinion planetary gearset rotatably mounts inner pinions 137, shown only partially, which mesh with outer pinions 138 also rotatably mounted on the carrier. The outer pinions 138 further mesh with the ring gear 140 while the inner pinions 137 also mesh with the sun gear 142. As illustrated, the sun gear 142 is drivingly connected to the radial wall 143 of brake drun 144, which surrounds the two multi-plate clutches 130 and 132. The brake drum 144 and the connected sun gear 142 are selectively held from rotation by the application of force-balanced self-synchronizing brake band 145 (B4) operatively disposed about the drum to establish a torque-increasing low range drive ratio as will be later described.

The ring gear 140 of the double pinion planetary gearset 120 is drivingly attached with a smaller diameter ring gear 150 of the intermediate planetary gearset 130. This ring gear meshes with the planetary pinions 152 rotatably mounted carrier 154. Planetary pinions in turn mesh with the sun gear 156 of the intermediate or second gearset. The carrier 154 of pinions 152 is operatively connected to a brake drum 155 surrounded by a force balanced brake band 157 (B2) to hold the carrier of the second planetary gearset for reaction and condition the transmission for reverse drive as will be discussed below.

Clutch 130 (C1), which locks the double pinion planetary gearset 120 in second and fourth gears, comprises a first set of annular clutch plates splined to the outer circumference of the drum 128, which are interleaved with a second set of annular clutch plates splined to interior of the drum 144 disposed radially outward of the driving drum 128. The clutch 130 is drivingly engaged by the stroking of an annular piston 158 in response to the hydraulic charging of pressure chamber 160 from controls not illustrated. The piston 158 is moved to an off position by the return springs 162 when chamber 160 is opened to exhaust. The space between balance piston 159 and the apply piston 158 is held full of oil to balance the centrifugal effect of oil on the opposite of the apply piston. Piston 158 is housed in a space formed between the exterior of the drum 128 and an L-shaped annular part 129 attached to the input housing 127. A notched ring pressed on part 129 is for an input speed sensor 161 mounted on the transmission case 119.

Clutch 132 (C2) comprises a first set of clutch plates splined to the interior of driving drum 128 interleaved with a second set of clutch plates splined to the outer periphery of a connector drum 164. Clutch 132 is operatively engaged by the hydraulic charging of pressure chamber 166 from the controls effecting actuation of a piston 168 mounted for stroking movement within the drum 128 The engaged clutch 132 effects the drive of connector drum 164 and the elongates axially extending drive shaft 170 attached to drum 164 by a spline 125. Belleville spring 172 moves the piston 168 to an off position when chamber 166 is exhausted. As in clutch C1, the space between balance piston 177 and the apply piston 168 is held full of oil to balance the centrifugal effect of oil on the opposite side of apply piston 168.

As shown in FIG. 3, the sun gear 156 of the second planetary gearset 122 and the sun gear 182 of the third planetary gearset 124 are formed on each end of an tubular shaft 180 that is concentric with the drive shaft 170 and the input shaft 116. The tubular shaft 180 is drivingly connected to the radial wall of the cylindrical brake drum 181, which surrounds the third planetary gearset 124. A force-balanced self-synchronizing brake band 183 (B1) is operable to selectively engage this drum to hold the sun gears of both simple planetary gearsets for reaction.

The sun gear 182 of the third planetary gearset meshes with the planetary pinions 184 that in turn mesh with the teeth of the ring gear 186 which is drivingly connected by radial web 188 to the axially extending shaft 170. The planetary pinions 184 are rotatably mounted on carrier 190 which is drivingly connected to transmission output. More particularly, the carrier 190 projects radially outward and is drivingly connected to the forward extending drum 192 attached to sprocket 194, which operatively drives chain 198 to provide input to the final drive and further to the road wheels. Sprocket 194 is supported by a roller bearing assembly 196 operative on an inner race 12 formed as an integral part of stator shaft 114 having flange 110 for attachment onto pump cover 108.

Brake 147 (B3) comprises a first set of clutch plates splined to the exterior of ring gear 140 interleaved with another set of clutch plates splined into the inner wall of transmission case 119. Brake 147 is operatively engaged by pressurizing chamber 146 thereby effecting stroking of piston 149 against apply plate 148 and further, through the clutch plate pack and backing plate, against a retaining ring inserted in transmission case 119. This piston is retracted by compression springs, not shown, acting between the piston and the transmission case.

Figure 4:
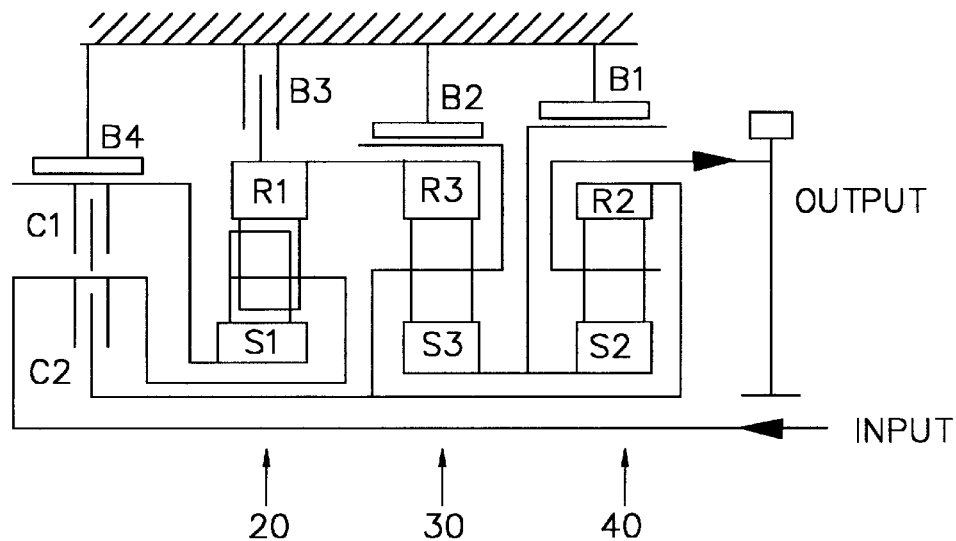
FIG. 4 is a diagrammatic view of another embodiment of the transmission of this invention which is similar to the embodiment of FIG. 1 but modified to have transmission input and outputs at opposite ends;.

The basic gearing and associated friction drive establishing devices (clutches and brakes) in the embodiment of FIG. 3 are shown diagrammatically in FIG. 4. The chart shown in FIG. 2, which applies also to the embodiments of FIGS. 3 and 4, sets forth the engagement of the various friction drive elements for establishing the six forward speed drives as well as the one reverse drive.

As shown in this chart, first gear of the embodiments of FIGS. 3 and 4 is established by the selected engagement of brake bands B1 and B4. The activation of these bands holds the sun gears of all three planetary gear units stationary so that they sense as reaction members. Under these conditions and with the input shaftI 116 driven by the engine through the torque converter, the carrier 136 of the dual pinion planetary gearset is rotatably driven in the direction of the input shaft. With the sun gear 142 held for reaction and with carrier 136 directly driven, the transmitted power flows from the ring gear 140 into the ring gear 150 of the intermediate planetary gearset 122. Since sun gear 156 of the intermediate planetary gearset 122 is held by the brake band 183, the output from the carrier 154 is transmitted through the drive shaft 170 to the ring gear 186 of the third planetary gearset 124. This gearset is also conditioned for a reduction drive with the sun gear 182 held for reaction and with carrier 190 providing the output thereof. In brief, the multiplied drive torque provided by the double pinion planetary is again multiplied in the second planetary gearset 122 and further multiplied in the third gearset 124.

Second gear is established by releasing the brake 145 (B4) while clutch C1 is being applied. A smooth transition from the brake 145 (B4) to the clutch 130 (C1) obtained by virtue of the self-synchronizing feature of brake B4. During this time brake band 183 (B1) remains engaged. With the sun gears 156 and 182 of the planetary gearsets 130 and 140 still being grounded and with the input gearset 120 locked, the power will flow from ring gear 140 to the ring gear 150 of the intermediate gearset 122. The multiplied torque from the carrier 154 is transferred to the ring gear 186 of the third planetary gearset 124 and therefrom to the carrier 190 and further to the output sprocket 194 drivingly attached to the carrier.

Third gear is established by engaging clutch 132 (C2) and releasing clutch 130 (C1) while brake 183 (B1) remains engaged. Under these conditions, the drive bypasses the dual pinion planetary and flows into the ring gear 186 of the third planetary gearset 124. With the ring gear 186 driven and sun gear 180 held, the carrier 190 is now driven at a third reduction ratio.

Fourth gear is established by the engagement of the two clutches 130 (C1) and 132 (C2) while the brake band B1 is released. Under these conditions, the transmission 100 is locked for a direct drive ratio.

Fifth gear, which is an overdrive, is established by still holding clutch 132 (C2) applied and engaging brake band 145 (B4). Under these conditions, the ring gears 150 and 186 of the simple planetary gearsets are driven in a split power path drive: one directly from the input shaft and the other from the ring gear 140. The output carrier 190 is resultantly driven at an overdrive ratio.

Sixth gear, which is yet deeper overdrive is obtained by maintaining application of clutch 132 (C2) and by applying friction device 147 (B3) A multi-plate brake is used here instead of a band. Due to the shortness of this transmission there is no room for a band and because with only one or two friction plates, the drag force in this case is relatively small.

Reverse gear is established by the engagement of the brake bands B2 and B4, that sets the output 194 for driving in a reverse direction.

As will be understood from FIGS. 3 and 4, the two concentric multi-plate clutches 130, 132 and the band 145, comprising half of the friction drive establishing devices are compacted and closely nested into the end of the transmission case and immediately outboard of the double pinion planetary gearset 120. The brake drums 155, 181, which are placed in general axial alignment and closely over the gearsets 120, 122 and 124 for space conservation. Moreover, these drums are surrounded by force balanced brake bands 157, 183 which, since there is no significant side loading, require no supporting structures. With gear units and clutches brought together, the need for shafts or other connecting members are minimized. All of the above make the transmissions of this invention extremely compact. For example, the overall length of a six-speed transmission based on the construction shown in FIG. 3 and including a torque converter designed for a small vehicle powered with a 1.6 liter engine measures only 310 millimeters. One particular design study has shown this invention makes possible a six-speed automatic transmission that fits in the same space as a current three-speed transmission.

Figure 5:
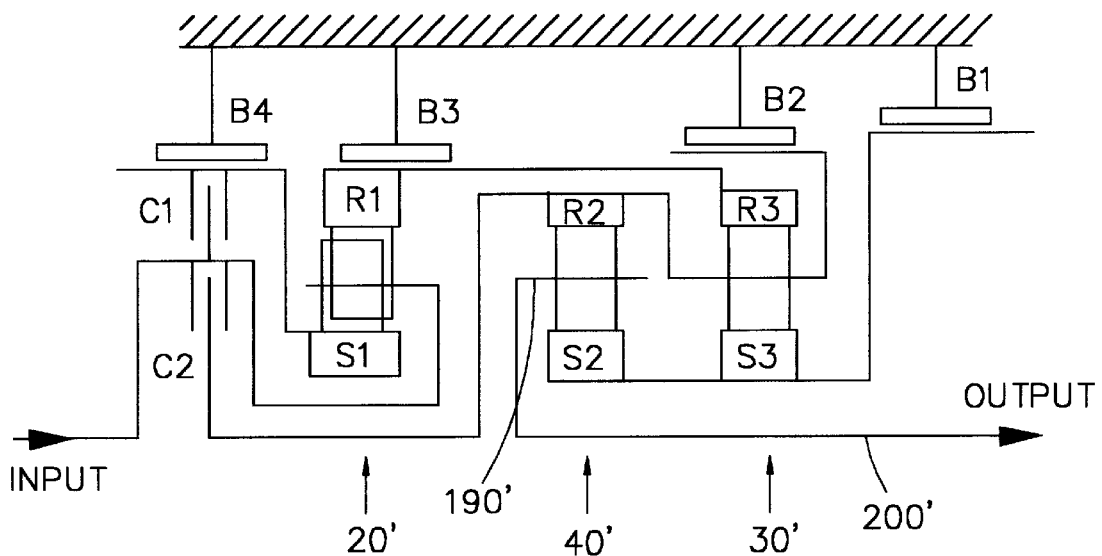
FIG. 5 is a diagrammatic view of another embodiment of this invention.

FIG. 5 illustrates a rear wheel drive transmission incorporating the planetary gearsets and the concentric clutch and brake arrangements of FIGS. 3 and 4 but having the transmission input and output at opposite ends of the gear box. It will be appreciated that the output drive sprocket 194 of FIG. 3 has been removed and that the gearsets 30 and 40 have been reversed and now identified as 30' and 40'. With the reversal of gearsets, the carrier 190 of gearset 40' provides the output of the transmission which is connected to an elongated output shaft 200. All other components of the FIG. 5 correspond to the components of the FIGS. 3 and 4 arrangement. The multi-plate clutch B3 of FIG. 3 is replaced by a brake band B3'. As in the previous embodiment the six forward drive and one reverse drive ratio are set forth in the schedule of FIG. 2.

Figure 6:
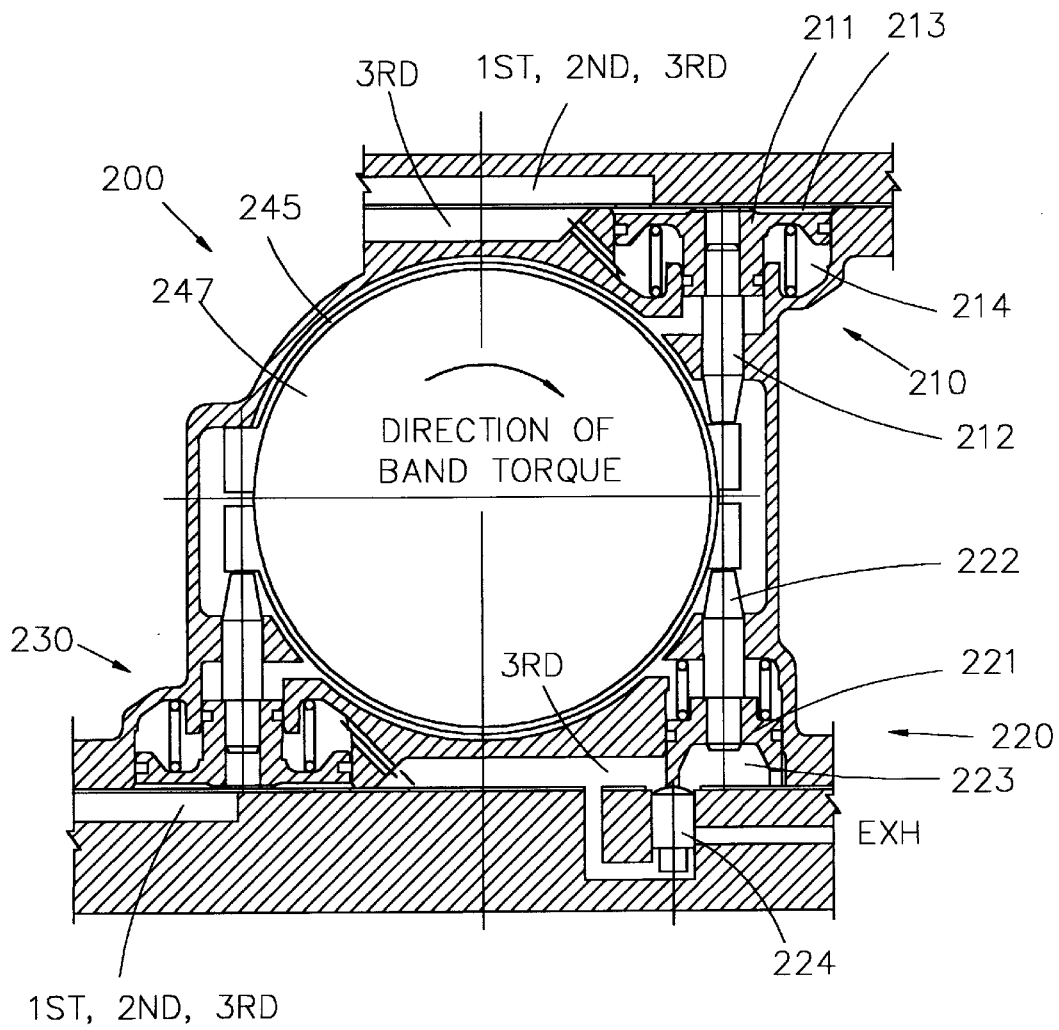
FIGS. 6, 6a, 7, 8 and 9 are cross sections of brake band friction devices used with this invention.
Figure 7:
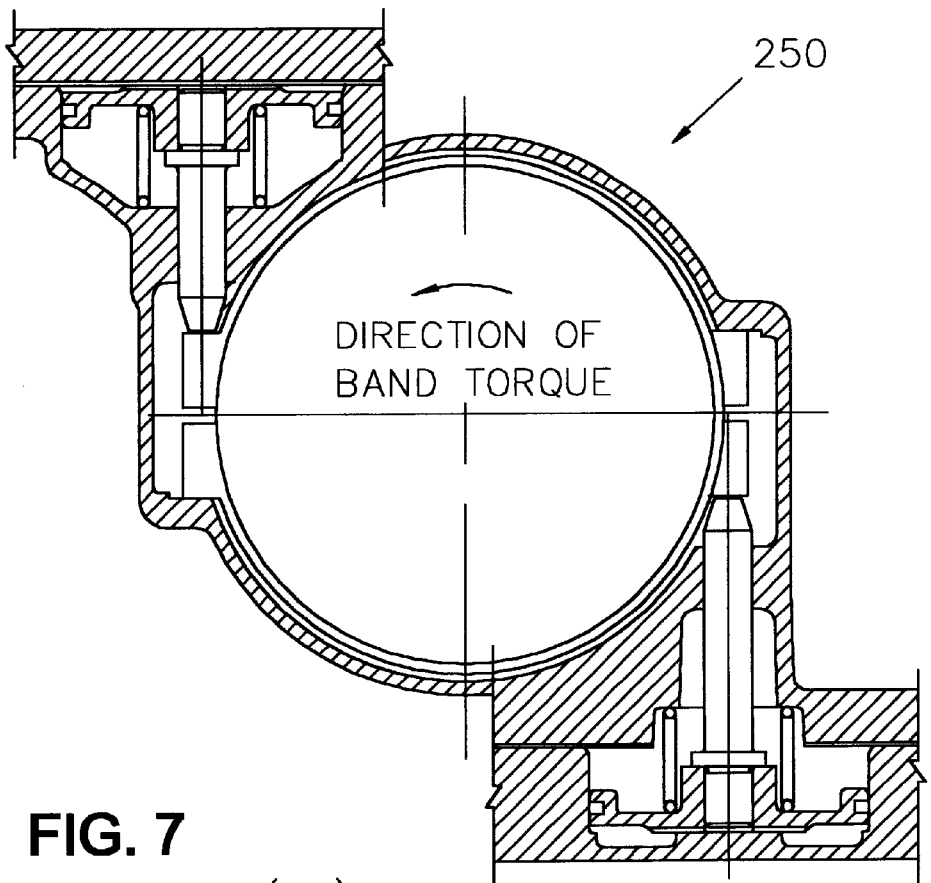

The cross section of the various friction brake bands and their actuating systems employed in this invention for achieving smooth shifting and high degree compactness are shown in FIGS. 6, 7. 8 and 9. They are based on my previously cited patents for self-synchronizing bands and force-balanced bands and are described here only as much as they are relating to and impacting these transmissions.

As explained in greater detail in the referred U.S. Pat. No. 5,588,928, a self-synchronizing band has two selective operating modes; a normal lock mode wherein the band function like a conventional friction band, and an one-way mode wherein the band functions like a freewheeling device—holding torque in one direction and turning free in opposite direction. Upon a shift signal the off-coming band is set in one-way mode by a mode valve, not shown. In this mode band is self-regulating its torque capacity in linear relationship to the torque it is transmitting. Consequently, when the torque in the on-coming friction device becomes high enough to reduce the torque in the off-coming band to zero, the capacity of the band also falls to zero. The resulting shifts are smooth like those obtained with conventional one-way roller clutches.

The above illustrations delineate sections cut transversely through each brake band identified as B1, B2, B3 and B4. One of them is a force-balanced self-synchronizing band (B1), another ajust self-synchronizing band (B4) and the remaining two are non-shifting force-balanced bands (B2 and B3). The following description refers to FIG. 1 relating to the first embodiment of this invention.

Figure 6A:
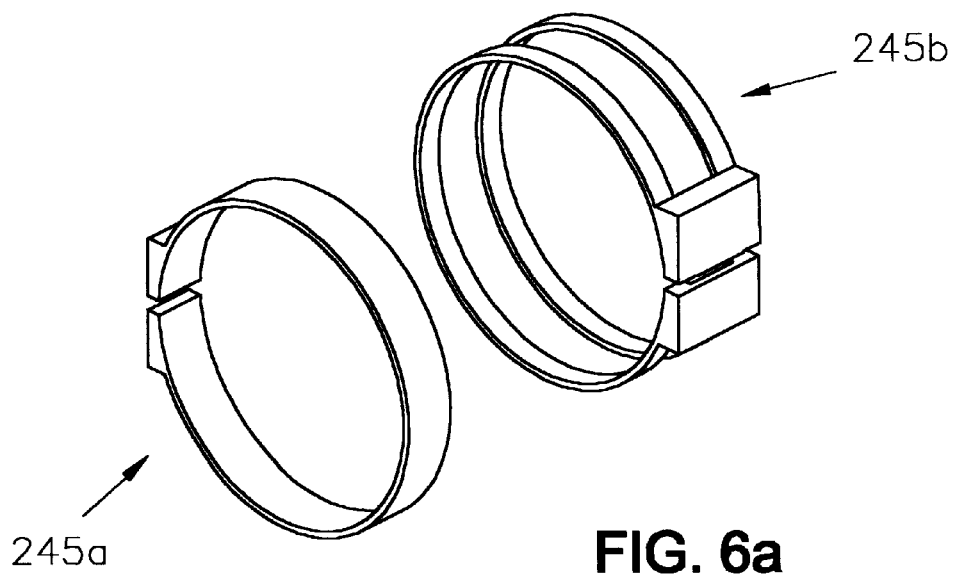

Brake band B1, which possesses both force-balancing and self-synchronizing abilities, is applied in first, second and third gears. It comprises brake drum 247, band assembly 245 and three actuating pistons, as shown in FIG. 6. As shown in FIG. 6*a*, the band assembly 245 consists of two independent parts, an inner single-strap band 245*a* and an outer double-strap band 245*b* straddling the inner band. The outer band straps are connected to each other by the end lugs bridging the inner band.

In first gear the inner band 245*a* is actuated when chamber 213 formed behind a stepped piston 211 is pressurized. At this time chambers 214 is exhausted. The reaction force from the band thrusts against the bottomed reaction piston 221. The outer dual-strap band 245*b* is applied by servo 230, which is identical to servo 210 rotated 180 degrees. The reaction force is transmitted here directly to transmission case. Since both servos are identical and applied by common oil, the corresponding forces acting on both hands are equal in magnitude and directionally opposite thereby rendering the brake drum free of any resultant side forces. Not needing a support bearing in plane forces, the brake band can be located in any suitable place along the existing annular space formed between rotating components and transmission case wall.

In second gear brake band B1 remains applied as in first gear.

In the third gear, band B1 is made capable of providing smooth self-synchronized 3–4 power upshifts and 4–3 downshifts. Since the band torque in third gear is much lower than in first gear, the torque capacity of the band must be reduced substantially to obtain smooth, well-timed shifts. This is done by pressurizing chamber 214 with third oil to create a force opposing the first gear apply force. The basic events during a 3–4 upshift are as follows:

At the beginning chambers 213, 214 and 223 are charged with system oil fed from the line passage through a fixed orifice. Bottomed reaction piston is pushing the exhaust control valve 224 down blocking the exhaust port 225. When the tangential force from the descending torque carried by the band diminishes to the point, where the reaction force exceeds the sum of band force and apply force, the reaction piston and the exhaust control valve begin to move upward to a position where the oil flow through exhaust port 225 has reduced the system oil pressure down to a value, where the band forces are again in equilibrium. From this point on, torque capacity of the band stays linearly related to the torque the band is subjected to.

Figure 8:
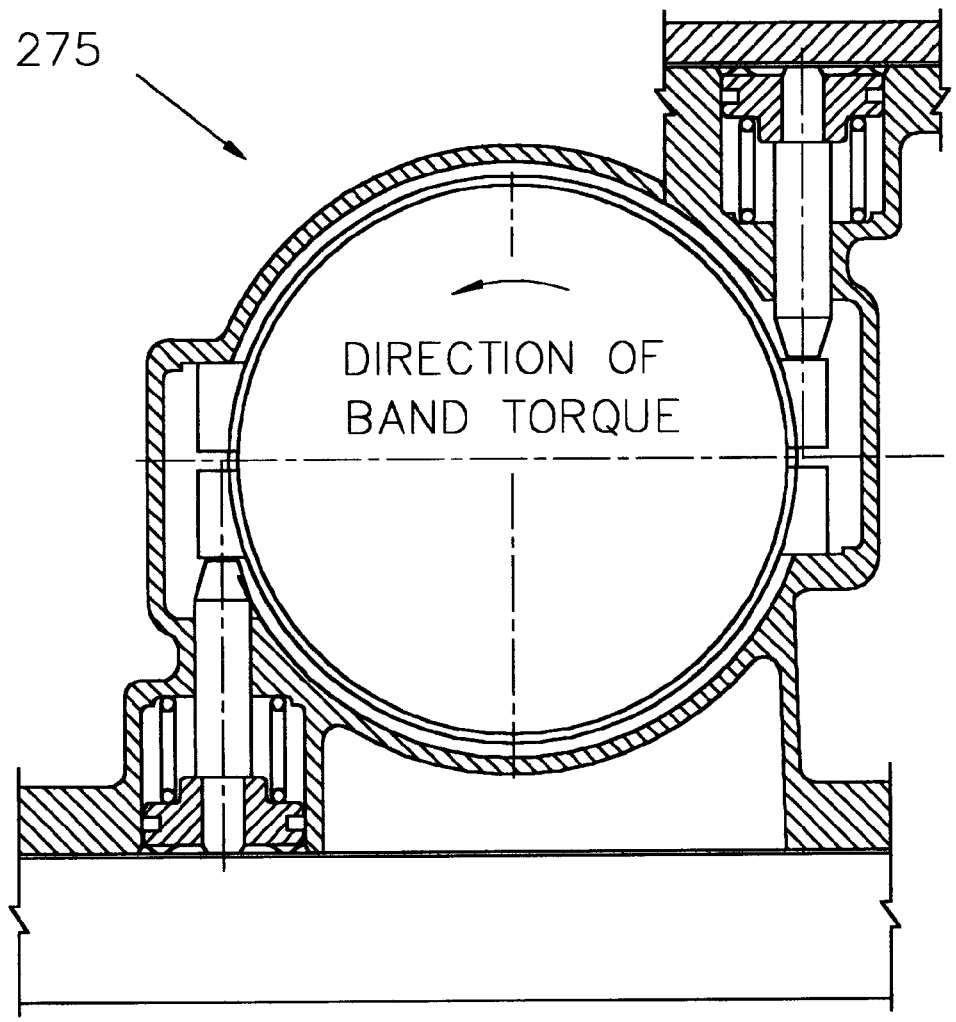
Figure 9:
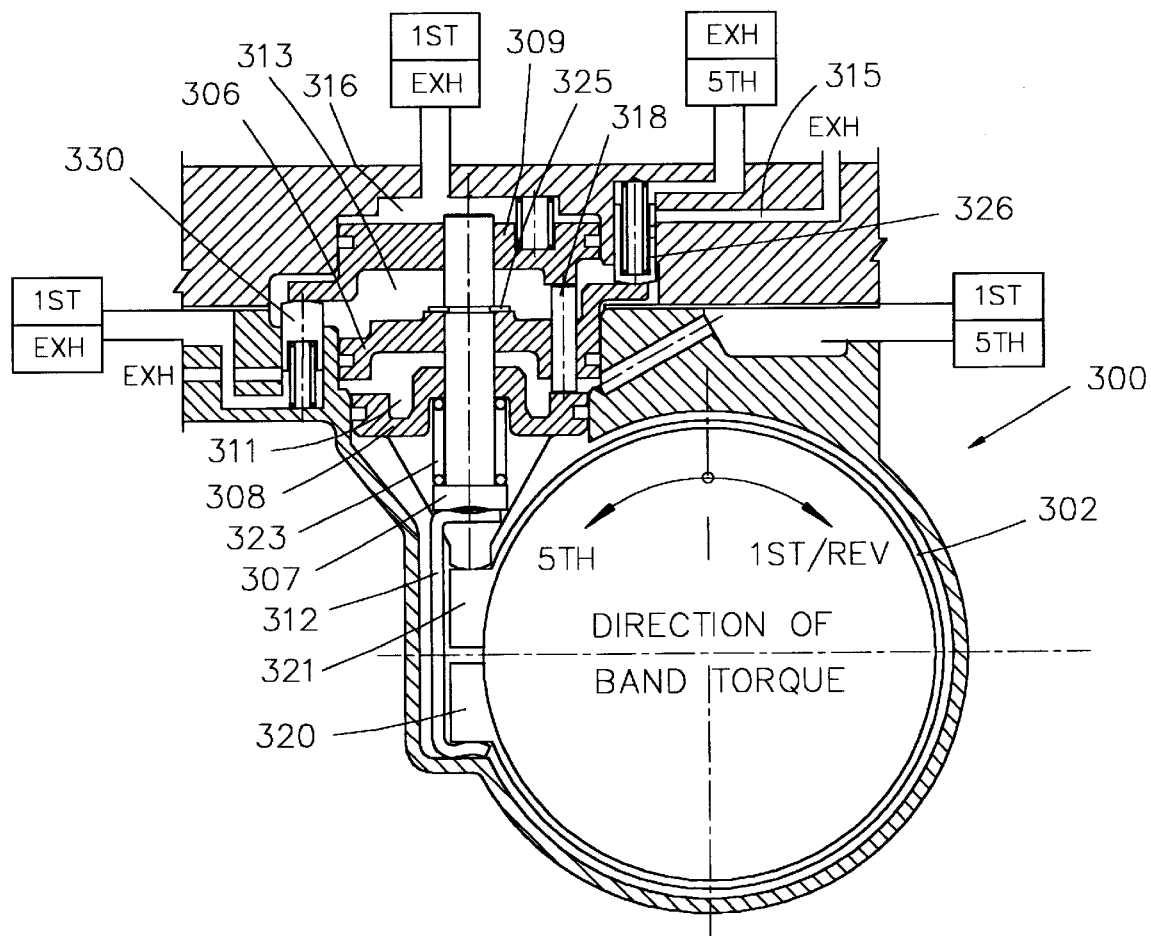

Both reverse brake band 250 (B2) and the sixth gear brake band 275 (B3), shown in FIGS. 7 and 8 respectively, are non-shifting bands, which are force-balanced basically they same way as in the previously described brake band 200 (B1).

Brake band B4, which applied in first, fifth and reverse gear, requires the self-synchronizinq feature, at least for the first fear, but not the force-balancing feature since it can be properly supported to the ground. Band 302 is a conventional single wrap band actuated by a servo 300, which includes an apply piston 306 and two reaction pistons 308 and 309 operating in tandem. A pull rod 307, penetrating through the lower reaction piston 308, is fastened to apply piston 306 by snap ring 325. The end of the extension 312 affixed to the pull rod 307 is bent to hook behind the lug at the apply end of the band 302. The force from the upper reaction piston 309 is transmitted to the lower piston by pins 318 passing through holes formed in apply piston 306. The engagement of the band B4 to establish a first gear begins when the chamber 311 formed between apply piston 306 and lower reaction piston 308, and the inner and outer chambers 315 and 316 formed behind piston 309 are pressurized. Apply piston 306 moves upward pulling the band from the apply end lug 320 while the tandem-acting reaction pistons 308 and 309 move downward pushing the band at the reaction end lug 321. Bottom side of the reaction piston 308 has tvo downward extending walls on either side of the pull rod 307 in contact with the brake band. The band is released by spring 323 acting between piston 308 and pull rod 307.

The self-synchronized upshift from first gear to second gear is essentially the same as the previously described 3–4 shift with brake band B1. Here exhaust valve 330 regulates the system pressure reducing it down to a near-zero value at torque reversal as is needed for a smooth self-synchronized shift.

In fifth gear the reaction torque is acting in a direction opposite to its direction in first gear. Consequently, the first gear the lower reaction piston 308 was made to take the role of an apply piston and the apply piston 306 to take the role of a reaction piston.

Brake band B4 is applied by pressurizing chamber 311 causing piston 308 moving downward and the piston 306 upward. The system is designed such that in normal applied mode, in fifth gear, the sum of apply force and band tangential force normally exceeds the reaction force causing the actuating system move downward. When, during an 5–6 upshift, the band force diminishes such that the reaction force overcomes the sum force, the reaction piston 306 moves upward causing the exhaust control valve 326 also move up to open the exhaust port 315. This starts the regulation of the system pressure and the torque capacity of the brake band as described previously.

Although the form of the invention illustrated and described here constitutes preferred embodiments of the invention, it is not intended to illustrate all possible forms of the invention. Various changes in the disclosed form of the invention may accordingly be made without departing from the spirit and scope of the invention.

What is claimed is:

1. A change ratio power transmission having an input member driven in a first rotary direction, a rotatable output member, a first planetary gearset having a sun gear and a ring gear and inner and outer planetary pinions operatively meshing with each other, said inner planetary pinions operatively mesh with said sun gear and said outer planetary pinions operatively meshing with said ring gear, a carrier for said inner and outer planetary pinions drivingly connected to said input member, a second planetary gearset having a sun gear and a ring gear and planetary pinions which mesh with said sun and ring gears thereof and a carrier for said last mentioned planetary pinions, a drive connection between said rings gear of said first and second planetary gearsets, a third planetary gearset having a sun gear and a ring gear and planetary pinions which mesh with said sun and ring gears thereof and a carrier for said planetary pinions of said third planetary gearset drivingly connected to said output member, a drive member operatively connecting said last mentioned sun gears for rotation together, a drive connection drivingly interconnecting said carrier of said second gearset to said ring gear of said third gearset, a first clutch selectively engageable for locking said first gearset for rotation as a unit, a second clutch selectively engageable for drivingly said carrier of said first gearset to the carrier of said second gearset a first brake selectively operable to simultaneously hold said sun gears of said second and third gearsets for reaction, a second brake for selectively holding said carrier of said second gearset for reaction and a third brake for selectively holding said ring gears of said first and said second gearsets for reaction and a fourth brake for selectively holding said sun gear of said first gearset for reaction.

2. The transmission of claim 1 wherein said third brake is a multi-plate brake and wherein said third brake is selectively engaged by a piston which encompasses the first and second clutches and said fourth brake.

3. The transmission of claim 1 wherein only said first and said fourth brakes are operatively engaged to condition all of said gearsets for a series of reduction drives and said transmission for a first forward drive ratio and further wherein said first clutch is selectively engaged and said fourth brake is released to condition said transmission for a second forward drive ratio and further wherein said first clutch is released and said second clutch is engaged to condition said transmission for a third forward drive ratio.

4. The transmission of claim 3 wherein said first brake is subsequently released and said first clutch is operatively engaged so that all of said planetary gearsets are locked for a direct drive ratio.

5. The transmission of claim 4 wherein only said second clutch and said fourth brake are operatively engaged to condition said transmission for a fifth forward drive and a first overdrive ratio and further wherein only said second clutch and third brake are operatively engaged to condition said transmission for a sixth forward drive and a second overdrive ratio.

6. The transmission of claim 5 wherein only said second and fourth brakes are engaged to condition said transmission for a reverse drive ratio.

7. A change speed power transmission for an automotive vehicle comprising rotatable input and output members, first, second and third planetary gearsets operatively connected in series to one another and operatively connecting said input member to said output member, said first planetary gearset having a sun gear and a ring gear and inner and outer planetary pinions that mesh with one another and arranged to operatively mesh with said sun and ring gears, said first gearset further having a carrier for said meshing planetary pinions, second and third planetary gearsets having sun and ring gears respectively and respectively having planetary pinions operatively interconnecting said associated sun and ring gears, second and third carriers for said planetary pinions of said second and third gearsets, said carrier of said first planetary gearset being connected directly to said input member, said carrier of said second gearset being connected to drive the ring gear of said third gearset and said carrier of said third gearset being connected to drive said output member, a first selectively engageable brake for holding said sun gear of said first gearset for reaction and a second selectively engagable brake for holding both of the sun gears of said second and third planetary gearsets for reaction so that said drive ratio of said first gearset thereby established is further multiplied by said drive ratio of said second gearset and that is further multiplied by the drive ratio of the third gearset to thereby establish a first torque increasing and speed reducing input/output member drive ratio.

8. The change speed transmission of claim 7 whereby said first and second selectively brakes are band brakes.

9. A change speed power transmission for an automotive vehicle comprising rotatable transmission imput and output members, first, second and third planetary gearsets operatively connected in series to one another and operatively connecting said input member to said output member, said first of said planetary gearsets being a double pinion planetary gearset having a sun and a ring gear operatively interconnected by said double pinion planet gears and a carrier for said double pinion planetary gears, said second and third planetary gearsets each having planet gears meshing with said associated sun and ring gears, and second and third carriers for said planetary gears, said carrier of said first planetary gearset being directly connected to said input member, said carrier of said second planetary gearset being connected to drive the ring gear of said third gearset and said carrier of said third planetary gearset being the output of all of said planetary gearsets and being directly connected to drive said output member, a first brake selectively engagable for holding said sun gears of said second and third planetary gearsets for reaction so that a first speed ratios is established with the ratio of said first gearset being multiplied in series by the established ratios of said second and said third gearsets.

10. The transmission of claim 9, wherein said transmission is operatively mounted within a transmission housing and wherein said input extends axially within said housing and wherein said clutches and said brake bands are concentrically mounted at one end of said housing.

11. A change ratio transmission for an automatic transmission for a vehicle comprising rotatable power input and output members, first, second and third planetary gearsets operatively connected to one another and operatively connecting said input and said output member, said first planetary gearset being a double pinion planetary gearset and said second and third planetary gearsets being simple planetary gearsets, said double pinion planetary gearset having a carrier directly connected to said input member and having a ring gear directly connected to said ring gear of said second planetary gearset, said second and third planetary gearsets having sun gears directly connected to one another, said carrier of said second planetary gearset being connected to said ring gear of said third planetary gearset, said carrier of said third gearset being drivingly connected to said output member, a first selectively engageable brake for holding said sun gears of said simple planetary gearsets for reaction, a second selectively engageable brake for holding said carrier of said second planetary gearset and said ring gear of said third gearset for reaction, a third selectively engageable brake for holding said ring gears of said first and second planetary gearsets in reaction, a fourth selectively engageable brake for holding said sun gear of said first and second planetary gearsets for reaction, a first selectively engageable clutch for drivingly connecting said sun gear to said carrier of said first planetary gearset to effect a lock-up of said first planetary gearset, a selectively engageable clutch for drivingly connecting said input to said carrier of said second planetary gearset, wherein (1) application of said first and fourth brakes establishes a first drive ratio, (2) application of said first brake and said first clutch establishes a second drive ratio, (3) application of said first brake and said second clutch establishes a third drive ratio and application of said first and second clutches locks up said gearset to establish a direct drive ratio.

12. The transmission of claim 11 wherein a first overdrive ratio is established by application of said second clutch and said fourth brake and wherein a second overdrive ratio is established by application of said second clutch and said third brake.

13. The transmission of claim 12 wherein a reverse ratio drive is established by selective engagement of said second and fourth brakes.

* * * * *